United States Patent
Elliott (10) Patent No.: US 7,003,543 B2
(45) Date of Patent: Feb. 21, 2006

(54) STICKY Z BIT

(75) Inventor: John Elliott, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 875 days.

(21) Appl. No.: 09/870,461

(22) Filed: Jun. 1, 2001

(65) Prior Publication Data

US 2003/0005011 A1 Jan. 2, 2003

(51) Int. Cl.
G06F 7/00 (2006.01)

(52) U.S. Cl. .................................................... 708/525
(58) Field of Classification Search .................. 708/525
See application file for complete search history.

(56) References Cited

U.S. PATENT DOCUMENTS

| | | | |
|---|---|---|---|
| 3,771,146 A | 11/1973 | Cotton et al. ............... | 710/260 |
| 3,781,810 A | 12/1973 | Downing | |
| 3,886,524 A | 5/1975 | Appelt ....................... | 710/110 |
| 3,930,253 A | 12/1975 | Maida ........................ | 340/347 |

(Continued)

FOREIGN PATENT DOCUMENTS

| | | |
|---|---|---|
| EP | 0 554 917 A2 | 8/1993 |
| EP | 0 855 643 A1 | 7/1998 |
| EP | 0 992 888 | 12/2000 |
| EP | 0 992 889 | 12/2000 |
| JP | 01037424 A | 2/1989 |
| WO | 96/11443 | 4/1996 |

OTHER PUBLICATIONS

Moon B I et al.: "A 32-bit RISC Microprocessor with DSP Functionality: Rapid Prototyping" IEICE Transactions on Fundamentals of Electronics, Communications and Computer Sciences, Institute of Electronics Information and Comm. Eng. Tokyo, JP, vol. E84-A No. 5, pp. 1339-1347, XP001060025 ISSN: 0916-8508, May 2001.

(Continued)

Primary Examiner—D. H. Malzahn
(74) Attorney, Agent, or Firm—Baker Botts L.L.P.

(57) ABSTRACT

The indication of a status affected by the performance of an ALU mathematical operation is provided. The indication includes the setting and clearing of a status bit in a status register based on the production of an arithmetic result of zero by an ALU performing the ALU mathematical operation. The result may comprise a series of results, each result produced by an ALU mathematical operation instruction executed to perform the ALU mathematical operation. Indicating a status affected by the performance of the ALU mathematical operation instruction further includes determining whether the ALU mathematical operation instruction corresponds to an ALU mathematical operation instruction with carry as well as determining whether the result is a non-zero value. The status bit maintains a value of zero upon the production of a non-zero value until an ALU mathematical operation instruction without carry is determined.

12 Claims, 4 Drawing Sheets

U.S. PATENT DOCUMENTS

| | | | |
|---|---|---|---|
| 4,025,771 A | 5/1977 | Lynch, Jr. et al. | 708/521 |
| 4,074,353 A | 2/1978 | Woods et al. | 710/264 |
| 4,090,250 A | 5/1978 | Carlson et al. | 712/234 |
| 4,323,981 A * | 4/1982 | Nakamura | 708/518 |
| 4,379,338 A | 4/1983 | Nishitani et al. | 708/552 |
| 4,398,244 A | 8/1983 | Chu et al. | |
| 4,408,274 A | 10/1983 | Wheatley et al. | 364/200 |
| 4,451,885 A | 5/1984 | Gerson et al. | 708/200 |
| 4,472,788 A | 9/1984 | Yamazaki | |
| 4,481,576 A | 11/1984 | Bicknell | |
| 4,488,252 A | 12/1984 | Vassar | |
| 4,511,990 A | 4/1985 | Hagiwara et al. | |
| 4,556,938 A | 12/1985 | Parker et al. | |
| 4,615,005 A | 9/1986 | Maejima et al. | 713/601 |
| 4,626,988 A | 12/1986 | George | |
| 4,709,324 A | 11/1987 | Kloker | 364/200 |
| 4,730,248 A | 3/1988 | Watanabe et al. | |
| 4,742,479 A | 5/1988 | Kloker et al. | 364/746 |
| 4,768,149 A | 8/1988 | Konopik et al. | 364/200 |
| 4,779,191 A | 10/1988 | Greenblatt | 711/2 |
| 4,782,457 A | 11/1988 | Cline | |
| 4,800,524 A | 1/1989 | Roesgen | 364/900 |
| 4,807,172 A | 2/1989 | Nukiyama | |
| 4,829,420 A | 5/1989 | Stahle | |
| 4,829,460 A | 5/1989 | Ito | |
| 4,839,846 A | 6/1989 | Hirose et al. | |
| 4,841,468 A | 6/1989 | Miller et al. | 708/625 |
| 4,872,128 A | 10/1989 | Shimizu | |
| 4,882,701 A | 11/1989 | Ishii | |
| 4,926,371 A | 5/1990 | Vassiliadis et al. | 708/628 |
| 4,941,120 A | 7/1990 | Brown et al. | |
| 4,943,940 A | 7/1990 | New | |
| 4,945,507 A | 7/1990 | Ishida et al. | 708/530 |
| 4,959,776 A | 9/1990 | Deerfield et al. | |
| 4,977,533 A | 12/1990 | Miyabayashi et al. | |
| 4,984,213 A | 1/1991 | Abdoo et al. | |
| 5,007,020 A | 4/1991 | Inskeep | |
| 5,012,441 A | 4/1991 | Retter | |
| 5,032,986 A | 7/1991 | Pathak et al. | |
| 5,034,887 A | 7/1991 | Yasui et al. | 364/200 |
| 5,038,310 A | 8/1991 | Akagiri et al. | |
| 5,040,178 A | 8/1991 | Lindsay et al. | 371/21.5 |
| 5,056,004 A | 10/1991 | Ohde et al. | |
| 5,099,445 A | 3/1992 | Studor et al. | |
| 5,101,484 A | 3/1992 | Kohn | |
| 5,117,498 A | 5/1992 | Miller et al. | |
| 5,121,431 A | 6/1992 | Wiener | 713/174 |
| 5,122,981 A | 6/1992 | Taniguchi | |
| 5,155,823 A | 10/1992 | Tsue | |
| 5,177,373 A | 1/1993 | Nakamura | 307/265 |
| 5,197,023 A | 3/1993 | Nakayama | |
| 5,197,140 A | 3/1993 | Balmer | |
| 5,206,940 A | 4/1993 | Murakami et al. | |
| 5,212,662 A | 5/1993 | Cocanougher et al. | |
| 5,218,239 A | 6/1993 | Boomer | 307/443 |
| 5,239,654 A | 8/1993 | Ing-Simmons et al. | 395/800 |
| 5,276,634 A | 1/1994 | Suzuki et al. | |
| 5,282,153 A | 1/1994 | Bartkowiak et al. | |
| 5,327,543 A | 7/1994 | Miura et al. | |
| 5,327,566 A | 7/1994 | Forsyth | |
| 5,375,080 A * | 12/1994 | Davies | 708/525 |
| 5,379,240 A | 1/1995 | Byrne | |
| 5,386,563 A | 1/1995 | Thomas, deceased | 395/650 |
| 5,392,435 A | 2/1995 | Masui et al. | 395/725 |
| 5,418,976 A | 5/1995 | Iida | 395/800 |
| 5,422,805 A | 6/1995 | McIntyre et al. | 708/625 |
| 5,432,943 A | 7/1995 | Mitsuishi | 395/725 |
| 5,448,703 A | 9/1995 | Amini et al. | |
| 5,448,706 A | 9/1995 | Fleming et al. | |
| 5,450,027 A | 9/1995 | Gabara | 326/98 |
| 5,463,749 A | 10/1995 | Wertheizer et al. | |
| 5,469,377 A | 11/1995 | Amano | |
| 5,471,600 A | 11/1995 | Nakamoto | |
| 5,497,340 A | 3/1996 | Uramoto et al. | |
| 5,499,380 A | 3/1996 | Iwata et al. | |
| 5,504,916 A | 4/1996 | Murakami et al. | 395/800 |
| 5,506,484 A | 4/1996 | Munro et al. | 318/599 |
| 5,517,436 A | 5/1996 | Andreas et al. | 364/736 |
| 5,525,874 A | 6/1996 | Mallarapu et al. | 318/254 |
| 5,548,544 A | 8/1996 | Matheny et al. | |
| 5,561,384 A | 10/1996 | Reents et al. | 327/108 |
| 5,561,619 A * | 10/1996 | Watanabe et al. | 708/525 |
| 5,564,028 A | 10/1996 | Swoboda et al. | 395/375 |
| 5,568,380 A | 10/1996 | Brodnax et al. | 364/184 |
| 5,568,412 A | 10/1996 | Han et al. | |
| 5,596,760 A | 1/1997 | Ueda | |
| 5,600,813 A | 2/1997 | Nakagawa et al. | |
| 5,611,061 A | 3/1997 | Yasuda | 395/591 |
| 5,619,711 A | 4/1997 | Anderson | |
| 5,623,646 A | 4/1997 | Clarke | 395/560 |
| 5,638,524 A | 6/1997 | Kiuchi et al. | 395/375 |
| 5,642,516 A | 6/1997 | Hedayat et al. | |
| 5,649,146 A | 7/1997 | Riou | 395/421.07 |
| 5,651,121 A | 7/1997 | Davies | 395/376 |
| 5,657,484 A | 8/1997 | Scarrá | 395/561 |
| 5,659,700 A | 8/1997 | Chen et al. | 395/421.07 |
| 5,682,339 A | 10/1997 | Tam | 364/715.08 |
| 5,689,693 A | 11/1997 | White | |
| 5,694,350 A | 12/1997 | Wolrich et al. | |
| 5,696,711 A | 12/1997 | Makineni | |
| 5,701,493 A | 12/1997 | Jaggar | 395/734 |
| 5,706,460 A | 1/1998 | Craig et al. | |
| 5,706,466 A | 1/1998 | Dockser | 395/452 |
| 5,715,470 A | 2/1998 | Asano et al. | |
| 5,737,570 A | 4/1998 | Koch | |
| 5,740,095 A | 4/1998 | Parant | 364/760 |
| 5,740,419 A | 4/1998 | Potter | |
| 5,740,451 A | 4/1998 | Muraki et al. | 395/733 |
| 5,748,516 A | 5/1998 | Goddard et al. | |
| 5,748,970 A | 5/1998 | Miyaji et al. | 395/733 |
| 5,764,555 A | 6/1998 | McPherson et al. | |
| 5,765,216 A | 6/1998 | Weng et al. | 711/214 |
| 5,765,218 A | 6/1998 | Ozawa et al. | 711/219 |
| 5,774,711 A | 6/1998 | Henry et al. | |
| 5,778,237 A | 7/1998 | Yamamoto et al. | 713/322 |
| 5,778,416 A | 7/1998 | Harrison et al. | |
| 5,790,443 A | 8/1998 | Shen et al. | |
| 5,808,926 A | 9/1998 | Gorshtein et al. | |
| 5,812,439 A | 9/1998 | Hansen | |
| 5,812,868 A | 9/1998 | Moyer et al. | 395/800.23 |
| 5,815,693 A | 9/1998 | McDermott et al. | 713/501 |
| 5,825,730 A | 10/1998 | Nishida et al. | |
| 5,826,072 A | 10/1998 | Knapp et al. | 395/567 |
| 5,826,096 A | 10/1998 | Baxter | |
| 5,828,875 A | 10/1998 | Halvarsson et al. | |
| 5,862,065 A | 1/1999 | Muthusamy | |
| 5,867,726 A | 2/1999 | Ohsuga et al. | 395/800.32 |
| 5,875,342 A | 2/1999 | Temple | 395/733 |
| 5,880,984 A | 3/1999 | Burchfiel et al. | |
| 5,892,697 A | 4/1999 | Brakefield | |
| 5,892,699 A | 4/1999 | Duncan et al. | |
| 5,894,428 A | 4/1999 | Harada | |
| 5,900,683 A | 5/1999 | Rinehart et al. | 307/126 |
| 5,909,385 A | 6/1999 | Nishiyama et al. | |
| 5,917,741 A | 6/1999 | Ng | |
| 5,918,252 A | 6/1999 | Chen et al. | 711/217 |
| 5,930,159 A | 7/1999 | Wong | |
| 5,930,503 A | 7/1999 | Drees | |
| 5,936,870 A | 8/1999 | Im | 364/745.03 |
| 5,937,199 A | 8/1999 | Temple | 395/335 |
| 5,938,759 A | 8/1999 | Kamijo | |

| | | |
|---|---|---|
| 5,941,940 A | 8/1999 | Prasad et al. |
| 5,943,249 A | 8/1999 | Handlogten |
| 5,951,627 A | 9/1999 | Kiamilev et al. |
| 5,951,679 A | 9/1999 | Anderson et al. |
| 5,973,527 A | 10/1999 | Schweighofer et al. ...... 327/172 |
| 5,974,549 A | 10/1999 | Golan ......................... 713/200 |
| 5,978,825 A * | 11/1999 | Divine et al. ................. 708/525 |
| 5,983,333 A | 11/1999 | Kolagotla et al. ........... 711/219 |
| 5,991,787 A | 11/1999 | Abel et al. |
| 5,991,868 A * | 11/1999 | Kamiyama et al. ............ 712/32 |
| 5,996,067 A | 11/1999 | White |
| 6,002,234 A | 12/1999 | Ohm et al. .................. 318/729 |
| 6,009,454 A | 12/1999 | Dummermuth |
| 6,014,723 A | 1/2000 | Tremblay et al. |
| 6,018,757 A * | 1/2000 | Wong .......................... 708/525 |
| 6,026,489 A | 2/2000 | Wachi et al. |
| 6,044,392 A | 3/2000 | Anderson et al. |
| 6,044,434 A | 3/2000 | Oliver |
| 6,049,858 A | 4/2000 | Kolagotla et al. ........... 711/217 |
| 6,055,619 A | 4/2000 | North et al. ................... 713/36 |
| 6,058,409 A | 5/2000 | Kozaki et al. |
| 6,058,410 A | 5/2000 | Sharangpani |
| 6,058,464 A | 5/2000 | Taylor |
| 6,061,711 A | 5/2000 | Song et al. .................. 709/108 |
| 6,061,780 A | 5/2000 | Shippey et al. |
| 6,061,783 A | 5/2000 | Harriman ..................... 712/224 |
| 6,076,154 A | 6/2000 | Van Eijndhoven et al. |
| 6,084,880 A | 7/2000 | Bailey et al. ................ 370/395 |
| 6,101,521 A | 8/2000 | Kosiec |
| 6,101,599 A | 8/2000 | Wright et al. ................ 712/228 |
| 6,115,732 A | 9/2000 | Oberman et al. |
| 6,128,728 A | 10/2000 | Dowling |
| 6,134,574 A | 10/2000 | Oberman et al. |
| 6,144,980 A | 11/2000 | Oberman ..................... 708/627 |
| 6,145,049 A | 11/2000 | Wong |
| 6,181,151 B1 | 1/2001 | Wasson ....................... 324/765 |
| 6,202,163 B1 | 3/2001 | Gabzdyl et al. ............. 713/324 |
| 6,205,467 B1 | 3/2001 | Lambrecht et al. ......... 709/108 |
| 6,209,086 B1 | 3/2001 | Chi et al. .................... 712/244 |
| 6,243,786 B1 | 6/2001 | Huang et al. ................ 710/262 |
| 6,243,804 B1 | 6/2001 | Cheng ......................... 712/228 |
| 6,260,162 B1 | 7/2001 | Typaldos et al. .............. 714/55 |
| 6,282,637 B1 | 8/2001 | Chan et al. .................. 712/223 |
| 6,292,866 B1 | 9/2001 | Zaiki et al. .................. 710/264 |
| 6,295,574 B1 | 9/2001 | MacDonald ................. 710/261 |
| 6,300,800 B1 | 10/2001 | Schmitt et al. ................ 326/86 |
| 6,315,200 B1 | 11/2001 | Silverbrook et al. ......... 235/454 |
| 6,356,970 B1 | 3/2002 | Killian et al. ............... 710/269 |
| 6,377,619 B1 | 4/2002 | Denk et al. .................. 375/232 |
| 6,397,318 B1 | 5/2002 | Peh ............................. 711/220 |
| 6,412,081 B1 | 6/2002 | Koscal et al. ................. 714/34 |
| 6,434,020 B1 | 8/2002 | Lambert et al. .............. 363/17 |
| 6,487,654 B2 | 11/2002 | Dowling ..................... 712/244 |
| 6,523,108 B1 | 2/2003 | James et al. ................. 712/224 |
| 6,552,625 B2 | 4/2003 | Bowling ...................... 332/109 |
| 6,564,238 B1 | 5/2003 | Kim et al. ................... 708/513 |
| 6,633,970 B1 | 10/2003 | Clift et al. ................... 712/217 |
| 6,643,150 B2 | 11/2003 | Kawakami .................... 363/41 |
| 6,658,578 B1 | 12/2003 | Laurenti et al. ............. 713/324 |
| 6,681,280 B1 | 1/2004 | Miyake et al. ............... 710/261 |
| 6,694,398 B1 | 2/2004 | Zhao et al. .................. 710/260 |
| 6,724,169 B2 | 4/2004 | Majumdar et al. ........... 318/811 |
| 6,728,856 B2 | 4/2004 | Grosbach et al. ............ 711/202 |
| 6,751,742 B1 | 6/2004 | Duhault et al. .............. 713/323 |
| 6,763,478 B1 | 7/2004 | Bui ............................. 713/600 |
| 2002/0194466 A1 | 12/2002 | Catherwood et al. ........ 712/241 |
| 2003/0093656 A1 | 5/2003 | Masse et al. ................ 712/241 |
| 2004/0150439 A1 | 8/2004 | Greenfield ................... 327/131 |

OTHER PUBLICATIONS

Turley J: "Balancing Conflicting Requirements When Mixing RISC, DSPs"Computer Design, Pennwell Publ. Littleton, Massachusetts, IS, vol. 37, No. 10 pages 46, 48,50–53, XP000860706 ISSN:))10–4566.

Levy M: "Microprocessor and DSP Technologies Unite for Embedded Applications" EDN Electrical Design News, Cahners Publishing Co., Newtown Massachusetts, US, No. Europe, pp. 73–74, 76, 78–80, XP0000779113 ISSN:00127515, Mar. 2, 1998.

Intel, Pentium Procesor Family Developer's Manual, Vol. 3: Architrecture and Programming Manual,, pp. 3–1, 3–2, 3–15,14–1 to 14–30, 18–7, and 25–289 to 25–292, 1995.

Intel, Embedded Intel 486: Processor Family Developer's Manual, pp. 2–2, 3–17, 3–37, 4–5, 4–6, 10–1 to 10–12, 12–1 to 12–10, Oct. 1997.

Moore, M "Z80 Family Interrupt Structure". Barleywood (online), retrieved from the internet <URL: http://www-.gaby.de/z80/1653.htm>, 1997.

PCT Search Report based on PCT/US02/16706, 6 pages, mailed Sep. 27, 2002.

PCT Search Report based on PCT/US02/16705, 7 pages, mailed Sep. 9, 2002.

PCT Search Report based on PCT/US02/16921, 4 pages, mailed Oct. 18, 2002.

Sparc, International, Inc., "The Sparc Architecture Manual", Version 8, pp.1–303, 1992.

Sparc, International, Inc., "The Sparc Architecture Manual", Version 9, pp. 137–299, 1994–2000.

Free On–Line Dictionary of Computing (Foldoc), http://wombat.doc.ic.ac.uk/foldoc/foldoc.cgi?query=program+counter, 1995.

* cited by examiner

STICKY Z BIT

BACKGROUND OF THE INVENTION

1. Field of the Invention

The present invention relates to systems and methods for indicating the status of an ALU operation and, more particularly, to systems and methods for indicating the status of an ALU mathematical operation, pursuant to which the result is based on one or more prior results.

2. Description of Prior Art

Processors, including microprocessors, digital signal processors and microcontrollers, operate by running software programs that are embodied in one or more series of instructions stored in a memory. The processors run the software by fetching the instructions from the series of instructions, decoding the instructions and executing them. A 16-bit arithmetic logic unit (ALU) of a processor, including digital signal processors, are conventionally adept at processing ALU mathematical operation instructions, such as addition operation instructions, that operate on a data word or data byte, and indicates the various statuses affected by the execution of each ALU mathematical operation instruction with status flags. For example, a 16-bit ALU of a processor is adept at performing an addition operation according to an addition mathematical operation instruction on operands represented as a data word and indicating if the result of the addition operation produced an arithmetic result of zero by setting a zero status bit. In general, the statuses affected by a 16-bit ALU mathematical operation is set based on each single 16-bit result produced by the ALU mathematical operation. Accordingly, the statuses affected by a 16-bit ALU mathematical operation may be misleading in conditions where the result is based on one or more prior results and produced by executing a series of ALU mathematical operation instructions. These type of ALU mathematical operations execute in two processing cycles and produce a 16-bit results in each of the processing cycles to form the final result. As a result, the status flags may only indicate the statuses affected by the ALU mathematical operation based on a result produced during the most recent processing cycle instead of the results produced during both processing cycles.

There is a need for a new method of indicating the statuses affected by the performance of an ALU mathematical operation. There is a further need for a new method of indicating the statuses affected by the performance of an ALU mathematical operation producing a final result formed by two distinct semi-results. There is a further need for a new method of indicating the statuses affected by the performance of an ALU mathematical operation for each result produced during the performance of the ALU mathematical operation based on preceding results.

SUMMARY OF THE INVENTION

According to embodiments of the present invention, a method and a processor for indicating a status affected by the performance of an ALU mathematical operation are provided. The status affected by the performance of an ALU mathematical operation include the sticky zero flag for indicating whether a result of the ALU mathematical operation produced an arithmetic result of zero. The pre-requisite for employing the sticky zero flag is that a prior math operation must be a conventional math operation (i.e., no carry involved) that set the sticky zero flag with a one (1) or a zero (0) and the subsequent math operation is a math operation including a carry. The sticky zero flag maintains a setting indicating non-zero status upon the production of a non-zero result until the performance of a ALU mathematical operation not including a carry produces an arithmetic result of zero.

A method of indicating a status affected by the performance of an ALU mathematical operation according to an embodiment of the present invention includes executing an ALU mathematical operation instruction on a set of source operands. The method further includes determining that the ALU mathematical operation instruction corresponds to an ALU mathematical operation instruction with carry. The method further includes producing a result based on the set of source operands in accordance with the ALU mathematical operation instruction and setting a status flag based on the result.

In an embodiment of the present invention, the setting of the status flag includes determining that the result is a non-zero value. Upon determining that the result is a non-zero value the status flag is cleared by writing to it a value of zero. The value of zero is maintained in the status flag until an ALU mathematical operation instruction without carry is determined.

In an embodiment of the present invention, the setting of the status flag includes determining that the result is a zero value. Upon determining that the result is a zero, the value of the status flag is maintained.

A processor for indicating a status affected by the performance of an ALU mathematical operation includes an ALU operable to execute an ALU mathematical operation instruction on a set of source operands. The ALU can determines that the ALU mathematical operation instruction corresponds to an ALU mathematical operation instruction with carry. The ALU is further operable to produce a result based on the set of source operands in accordance with the ALU mathematical operation instruction and set a status flag based on the result.

BRIEF DESCRIPTION OF THE DRAWINGS

The above described features and advantages of the present invention will be more fully appreciated with reference to the detailed description and appended figures in which.

DETAILED DESCRIPTION OF THE INVENTION

According to embodiments of the present invention, a method and a processor for indicating a status affected by the performance of an ALU mathematical operation are provided. The status affected by the performance of an ALU mathematical operation include the sticky zero flag for indicating whether a result of the ALU mathematical operation produced an arithmetic result of zero. Moreover, the sticky zero flag indicates whether a result produced during the performance of the ALU mathematical operation produced an arithmetic result of zero. The sticky zero flag maintains a setting indicating non-zero status until a subsequent ALU mathematical math operation without carry produces a result of zero.

Figure 1:
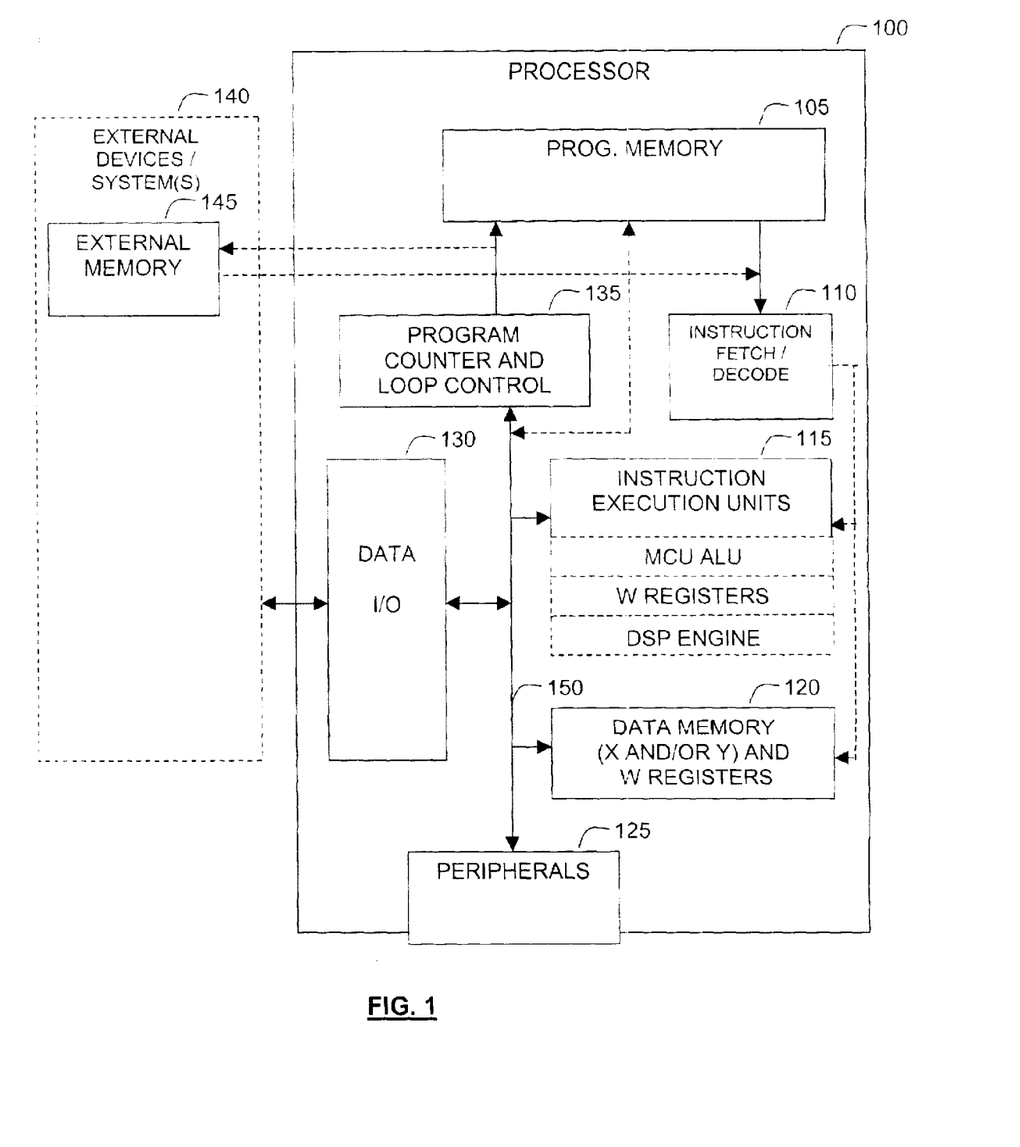
FIG. 1 depicts a functional block diagram of an embodiment of a processor chip within which embodiments of the present invention may find application.
Figure 2:
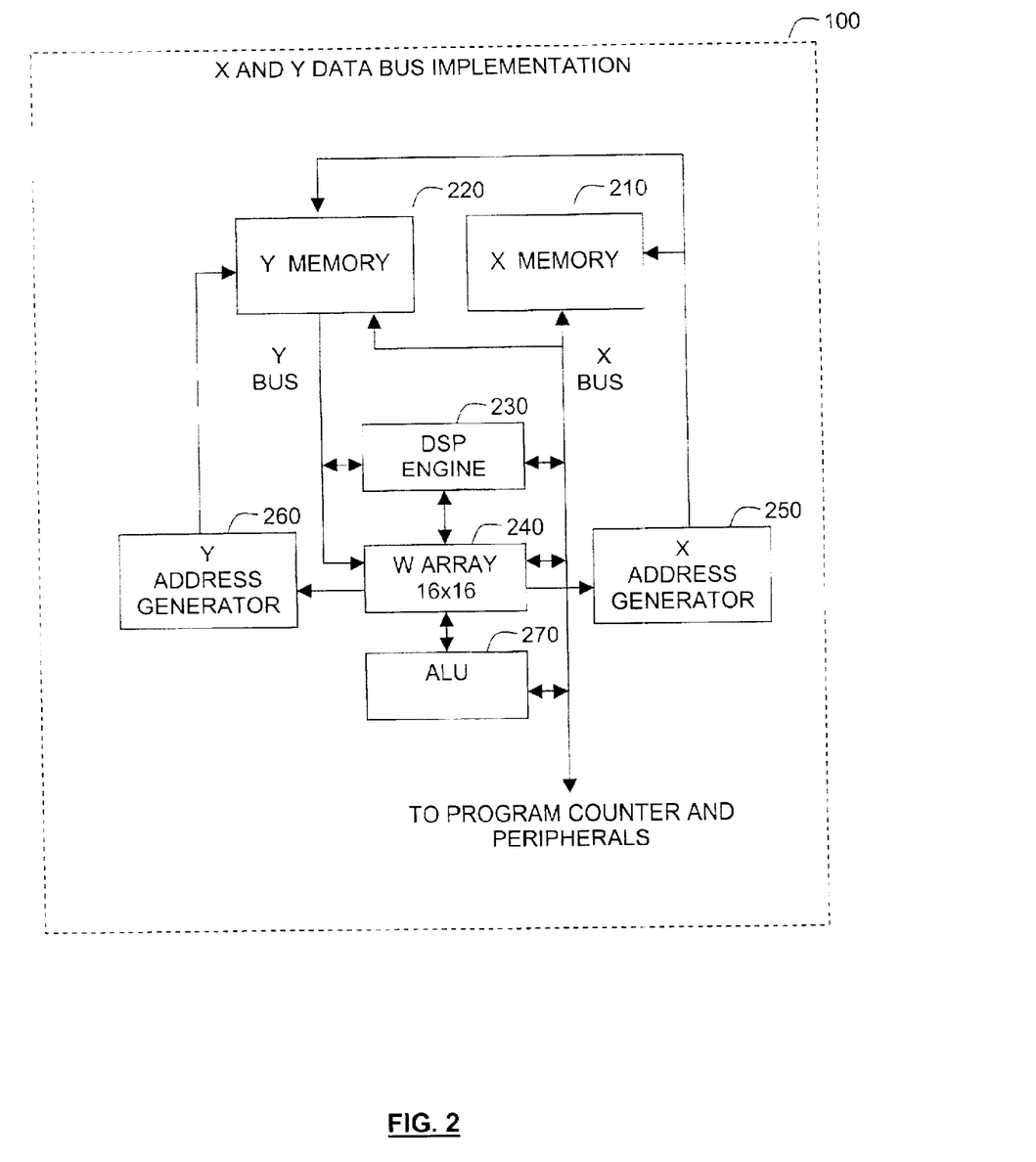
FIG. 2 depicts a functional block diagram of a data busing scheme for use in a processor, which has a microcontroller and a digital signal processing engine, within which embodiments of the present invention may find application.

In order to describe embodiments of ALU mathematical operation status indicating, an overview of pertinent processor elements is first presented with reference to FIGS. 1 and 2. The ALU mathematical operation status indicating is then described more particularly with reference to FIGS. 3–4.

Overview of Processor Elements

FIG. 1 depicts a functional block diagram of an embodiment of a processor chip within which the present invention may find application. Referring to FIG. 1, a processor 100 is coupled to external devices/systems 140. The processor 100 may be any type of processor including, for example, a digital signal processor (DSP), a microprocessor, a microcontroller or combinations thereof. The external devices 140 may be any type of systems or devices including input/output devices such as keyboards, displays, speakers, microphones, memory, or other systems which may or may not include processors. Moreover, the processor 100 and the external devices 140 may together comprise a stand alone system.

The processor 100 includes a program memory 105, an instruction fetch/decode unit 110, instruction execution units 115, data memory and registers 120, peripherals 125, data I/O 130, and a program counter and loop control unit 135. The bus 150, which may include one or more common buses, communicates data between the units as shown.

The program memory 105 stores software embodied in program instructions for execution by the processor 100. The program memory 105 may comprise any type of non-volatile memory such as a read only memory (ROM), a programmable read only memory (PROM), an electrically programmable or an electrically programmable and erasable read only memory (EPROM or EEPROM) or flash memory. In addition, the program memory 105 may be supplemented with external nonvolatile memory 145 as shown to increase the complexity of software available to the processor 100. Alternatively, the program memory may be volatile memory which receives program instructions from, for example, an external non-volatile memory 145. When the program memory 105 is nonvolatile memory, the program memory may be programmed at the time of manufacturing the processor 100 or prior to or during implementation of the processor 100 within a system. In the latter scenario, the processor 100 may be programmed through a process called in-line serial programming.

The instruction fetch/decode unit 110 is coupled to the program memory 105, the instruction execution units 115 and the data memory 120. Coupled to the program memory 105 and the bus 150 is the program counter and loop control unit 135. The instruction fetch/decode unit 110 fetches the instructions from the program memory 105 specified by the address value contained in the program counter 135. The instruction fetch/decode unit 110 then decodes the fetched instructions and sends the decoded instructions to the appropriate execution unit 115. The instruction fetch/decode unit 110 may also send operand information including addresses of data to the data memory 120 and to functional elements that access the registers.

The program counter and loop control unit 135 includes a program counter register (not shown) which stores an address of the next instruction to be fetched. During normal instruction processing, the program counter register may be incremented to cause sequential instructions to be fetched. Alternatively, the program counter value may be altered by loading a new value into it via the bus 150. The new value may be derived based on decoding and executing a flow control instruction such as, for example, a branch instruction. In addition, the loop control portion of the program counter and loop control unit 135 may be used to provide repeat instruction processing and repeat loop control as further described below.

The instruction execution units 115 receive the decoded instructions from the instruction fetch/decode unit 110 and thereafter execute the decoded instructions. As part of this process, the execution units may retrieve one or two operands via the bus 150 and store the result into a register or memory location within the data memory 120. The execution units may include an arithmetic logic unit (ALU) such as those typically found in a microcontroller. The execution units may also include a digital signal processing engine, a floating point processor, an integer processor or any other convenient execution unit. A preferred embodiment of the execution units and their interaction with the bus 150, which may include one or more buses, is presented in more detail below with reference to FIG. 2.

The data memory and registers 120 are volatile memory and are used to store data used and generated by the execution units. The data memory 120 and program memory 105 are preferably separate memories for storing data and program instructions respectively. This format is a known generally as a Harvard architecture. It is noted, however, that according to the present invention, the architecture may be a Von-Neuman architecture or a modified Harvard architecture which permits the use of some program space for data space. A dotted line is shown, for example, connecting the program memory 105 to the bus 150. This path may include logic for aligning data reads from program space such as, for example, during table reads from program space to data memory 120.

Referring again to FIG. 1, a plurality of peripherals 125 on the processor may be coupled to the bus 150. The peripherals may include, for example, analog to digital converters, timers, bus interfaces and protocols such as, for example, the controller area network (CAN) protocol or the Universal Serial Bus (USB) protocol and other peripherals. The peripherals exchange data over the bus 150 with the other units.

The data I/O unit 130 may include transceivers and other logic for interfacing with the external devices/systems 140. The data I/O unit 130 may further include functionality to permit in circuit serial programming of the Program memory through the data I/O unit 130.

FIG. 2 depicts a functional block diagram of a data busing scheme for use in a processor 100, such as that shown in FIG. 1, which has an integrated microcontroller arithmetic logic unit (ALU) 270 and a digital signal processing (DSP) engine 230. This configuration may be used to integrate DSP functionality to an existing microcontroller core. Referring to FIG. 2, the data memory 120 of FIG. 1 is implemented as two separate memories: an X-memory 210 and a Y-memory 220, each being respectively addressable by an X-address generator 250 and a Y-address generator 260. The X-address generator may also permit addressing the Y-memory space thus making the data space appear like a single contiguous memory space when addressed from the X address generator. The bus 150 may be implemented as two buses, one for each of the X and Y memory, to permit simultaneous fetching of data from the X and Y memories.

The W registers 240 are general purpose address and/or data registers. The DSP engine 230 is coupled to both the X and Y memory buses and to the W registers 240. The DSP engine 230 may simultaneously fetch data from each the X and Y memory, execute instructions which operate on the simultaneously fetched data and write the result to an accumulator (not shown) and write a prior result to X or Y memory or to the W registers 240 within a single processor cycle.

In one embodiment, the ALU 270 may be coupled only to the X memory bus and may only fetch data from the X bus. However, the X and Y memories 210 and 220 may be addressed as a single memory space by the X address generator in order to make the data memory segregation transparent to the ALU 270. The memory locations within the X and Y memories may be addressed by values stored in the W registers 240.

Any processor clocking scheme may be implemented for fetching and executing instructions. A specific example follows, however, to illustrate an embodiment of the present invention. Each instruction cycle is comprised of four Q clock cycles Q1–Q4. The four phase Q cycles provide timing signals to coordinate the decode, read, process data and write data portions of each instruction cycle.

According to one embodiment of the processor 100, the processor 100 concurrently performs two operations—it fetches the next instruction and executes the present instruction. Accordingly, the two processes occur simultaneously. The following sequence of events may comprise, for example, the fetch instruction cycle:

```
Q1: Fetch Instruction
Q2: Fetch Instruction
Q3: Fetch Instruction
Q4: Latch Instruction into prefetch register, Increment PC
```

The following sequence of events may comprise, for example, the execute instruction cycle for a single operand instruction:

```
Q1: latch instruction into IR, decode and determine addresses of
    operand data
Q2: fetch operand
Q3: execute function specified by instruction and calculate destination
    address for data
Q4: write result to destination
```

The following sequence of events may comprise, for example, the execute instruction cycle for a dual operand instruction using a data pre-fetch mechanism. These instructions pre-fetch the dual operands simultaneously from the X and Y data memories and store them into registers specified in the instruction. They simultaneously allow instruction execution on the operands fetched during the previous cycle.

```
Q1: latch instruction into IR, decode and determine addresses of
    operand data
Q2: pre-fetch operands into specified registers, execute operation in
    instruction
Q3: execute operation in instruction, calculate destination address for
    data
Q4: complete execution, write result to destination
```

ALU Mathematical Operation Status Indicating

Figure 3:
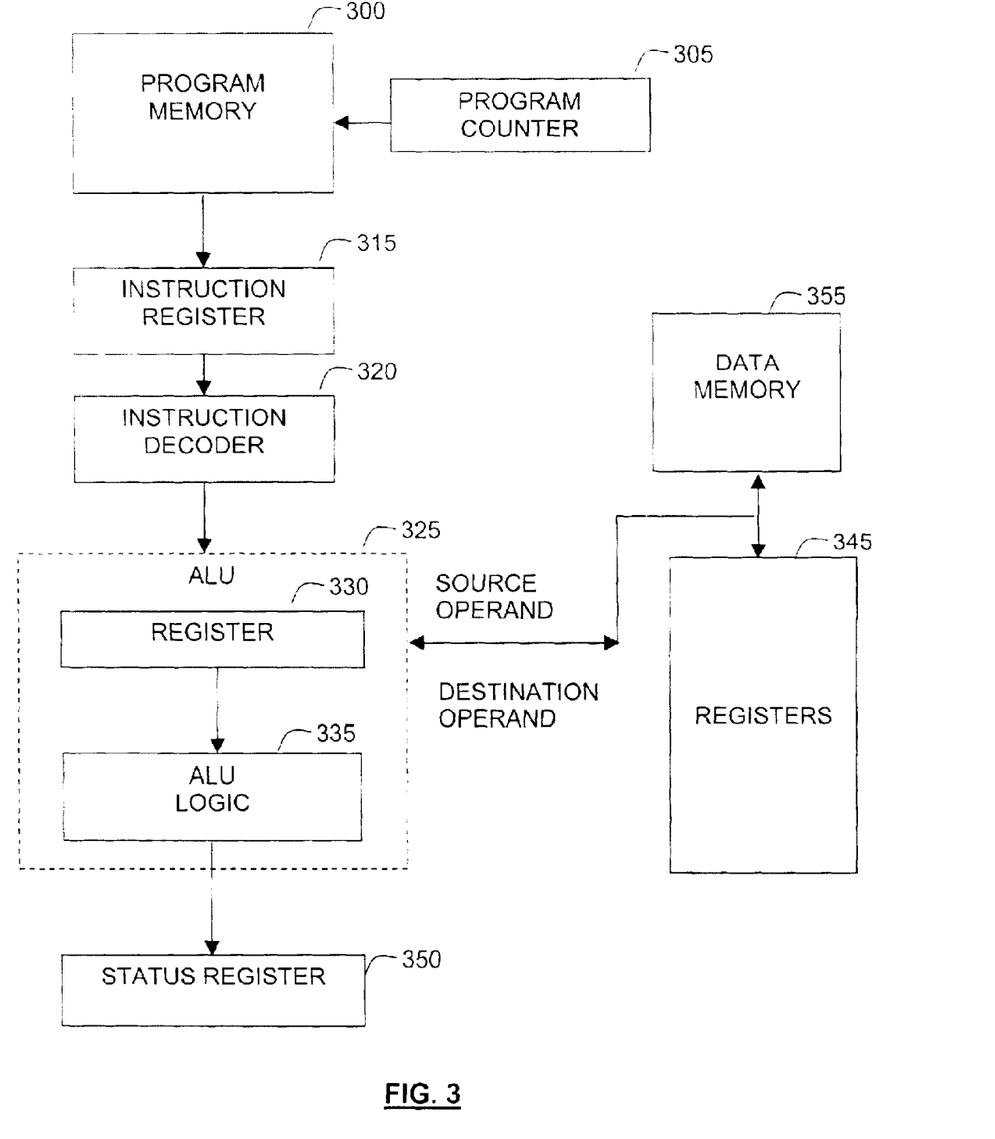
FIG. 3 depicts a functional block diagram of a processor configuration for indicating a status affected by the performance of an ALU mathematical operation according to embodiments of the present invention.

FIG. 3 depicts a functional block diagram of a processor for indicating a status of an ALU mathematical operation according to the present invention. Referring to FIG. 3, the processor includes a program memory 300 for storing instructions such as ALU mathematical operation instructions. The processor also includes a program counter 305 which stores a pointer to the next program instruction that is to be fetched. The processor further includes an instruction register 315 for storing an instruction for execution that has been fetched from the program memory 300. The processor may further include pre-fetch registers (not shown) that may be used for fetching and storing a series of upcoming instructions for decoding and execution. The processor also includes an instruction decoder 320, an arithmetic logic unit (ALU) 325, registers 345 and a status register 350.

The instruction decoder 320 decodes instructions, such as ALU mathematical operation instructions, that are stored in the instruction register 315. Based on the combination of bits in the instruction, the instruction decoder 320 decodes particular bits in ALU mathematical operation instructions that results in the selective activation of logic within the ALU 325 for fetching operands, performing the operation specified by the fetched instruction on the operands, producing an output/result in accordance with the instruction to the appropriate data memory location and setting a status bit in accordance with the operation performed on the operands by the instruction.

The ALU 325 includes registers 330 that may receive one or more operands from the registers 345 and/or a data memory location 355. The origin of the one or more operands depends on the addressing mode defined by the combination of bits used in the instruction. For example, one combination of address mode bits results in the activation of logic that obtains one operand from data memory across the X data bus depicted in FIG. 2, another operand from a register.

The ALU 325 includes ALU logic 335 which may receive the one or more operands from the registers 330. The ALU logic 335 executes arithmetic and logic operations according to instructions, such as ALU mathematical operation instructions, decoded by the instruction decoder on the one or more operands fetched from the registers 345 and/or from address location in the data memory 345. The ALU logic 335 produces outputs/results in accordance with the arithmetic and logic operations based on the one or more operands to one of registers 345 and/or the status register 350. The outputs/results may be stored/written to the register in accordance with bits specified in the instruction.

Status register 350 contains status bits that indicate the status of processor elements and operations. Status register 350 may be a 16-bit status register. The status register 350 may be separated into a lower segment and an upper segment. The processor operations for which status may be indicated include MCU ALU, DSP Adder/Subtractor, repeat, and Do loop. A bit in the status register 350, such as a sticky z bit, can indicate whether an operation, such as an ALU mathematical operation, produce an arithmetic result of zero. An ALU mathematical operation may comprise of a series of ALU mathematical operation instructions, some specifying a carry and some not specifying a carry, but each producing an arithmetic result. The bit is set, such as with a value of one (1) or zero (0), to indicate that an ALU mathematical operation instruction has been executed some time in the past which produced a zero arithmetic result or a non-zero arithmetic result. The bit is initially set with a value of one (1) by the execution of an ALU math operation instruction without carry produces a zero result. The bit remains set until a subsequent ALU mathematical operation instruction with carry is executed and produces a non-zero arithmetic result. When a non-zero result is produced, the bit is cleared, such as with a value of zero, and remains cleared until a subsequent ALU mathematical operation instruction without carry is executed and produces a zero arithmetic result. The application of the bit, such as the sticky z bit, is determined by the execution of an ALU mathematical operation instruction with carry subsequent to the execution of an ALU mathematical operation instruction without a carry.

Figure 4:
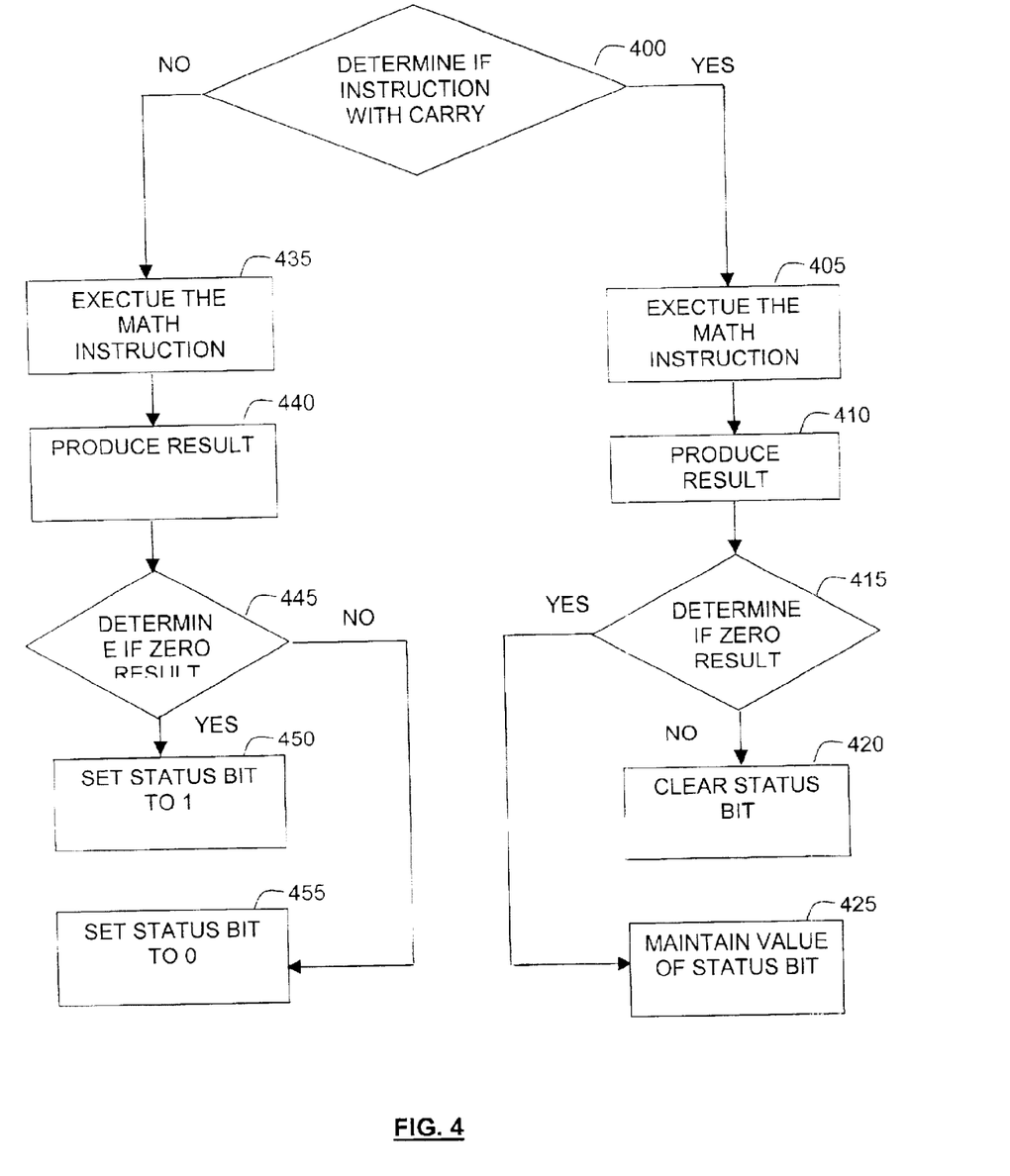
FIG. 4 depicts a method of indicating a status affected by the performance of an ALU mathematical operation according to embodiments of the present invention

FIG. 4 depicts a method of indicating a status of an ALU mathematical operation according to the present invention. FIG. 4 is best understood when viewed in conjunction with FIG. 3. Referring to FIG. 4, in step 400, the decoder 320 determines whether an ALU mathematical operation instruction specifies a carry operation. The instruction may be fetched from the program memory 300. The decoder determines whether the ALU mathematical operation instruction specifies a carry operation by decoding bits in the instruction. If an ALU mathematical operation instruction with carry is determined, then the method proceeds to step 405. In step 405, the ALU mathematical operation instruction is executed by ALU 325. The ALU performs an operation on one or more operands specified by the ALU mathematical operation instruction. Then in step 410, the ALU 325 produces an output/result in accordance with the performed operation. The output result may be stored in data memory or data registers as specified by the ALU mathematical operation instruction. In step 415, the ALU 325 determines whether the output/result produced an arithmetic result of zero. If the ALU did not produce an arithmetic result of zero, then the method proceeds to step 420 where the status bit is cleared, that is changing the bit value from one (1) to zero (0). The status bit maintains the value of zero until an ALU mathematical operation instruction is executed that is not an ALU mathematical operation instruction specifying a carry operation. If the ALU produced an arithmetic result of zero, then the method proceeds to step 425. In step 425, the ALU 325 does nothing until the next ALU mathematical operation instruction not specifying a carry is executed and produces a zero arithmetic result.

If an ALU mathematical operation instruction with carry is not determined, then the method proceeds to step 435. In step 435, the ALU mathematical operation instruction is executed by ALU 325. The ALU performs an operation on one or more operands specified by the ALU mathematical operation instruction. Then in step 440, the ALU 325 produces an output/result in accordance with the performed operation. The output result may be stored in data memory or data registers as specified by the ALU mathematical operation instruction. In step 445, the ALU 325 determines whether the output/result produced an arithmetic result of zero. If the ALU did not produce an arithmetic result of zero, then the method proceeds to step 455 where the status bit is set with a value of zero. If the ALU produced an arithmetic result of zero, then the method proceeds to step 450. In step 450, the status bit is set with a value of 1.

While specific embodiments of the present invention have been illustrated and described, it will be understood by those having ordinary skill in the art that changes may be made to those embodiments without departing from the spirit and scope of the invention.

What is claimed is:

1. A method of indicating a status affected by the performance of an ALU mathematical operation, comprising:

fetching an ALU mathematical operation instruction;

determining that the ALU mathematical operation instruction corresponds to an ALU mathematical operation instruction specifying the performance of a carry operation;

executing an ALU mathematical operation on a set of variable width source operands in accordance with the ALU mathematical operation instruction to produce a result; and indicating a status of the ALU mathematical operation is based on the result.

2. The method according to claim 1, wherein the step of indicating the status of the ALU mathematical operation includes the step of determining that the result is a non-zero value.

3. The method according to claim 2, wherein the step of indicating the status of the ALU mathematical operation includes the step of clearing a status flag by writing a value of zero to the status flag.

4. The method according to claim 3, wherein the step of indicating the status of the ALU mathematical operation includes the step of maintaining the value of zero in the status flag until an ALU mathematical operation instruction that excludes specifying the performance of an operation including a carry is executed.

5. The method according to claim 1, wherein the step of indicating the status of the ALU mathematical operation includes the step of determining that the result is a zero value.

6. The method according to claim 5, wherein the step of indicating the status of the ALU mathematical operation includes the step of maintaining the value in the status flag.

7. A processor for indicating a status affected by the performance of an ALU mathematical operation, comprising:

an instruction decode unit operable to:

fetch an ALU mathematical operation instruction; and determine that the ALU mathematical operation instruction corresponds to an ALU mathematical operation instruction specifying the performance of a carry operation;

an ALU coupled to the instruction decode unit, operable to:

execute an ALU mathematical operation on a set of variable width source operands in accordance with the ALU mathematical operation instruction to produce a result; and indicate a status of the ALU mathematical operation is based on the result.

8. The processor according to claim 7, further comprising the ALU operable to determine that the result is a non-zero value.

9. The processor according to claim 8, further comprising the ALU operable to clear a status flag by writing a value of zero to the status flag.

10. The processor according to claim 9, further comprising the ALU operable to maintain the value of zero in the status flag until an ALU mathematical operation instruction that excludes specifying the performance of an operation including a carry is executed.

11. The processor according to claim 7, further comprising the ALU operable to determine that the result is a zero value.

12. The processor according to claim 11, further comprising the ALU operable to maintain the value of the status flag.

* * * * *